US010812576B1

(12) United States Patent
Yuan et al.

(10) Patent No.: US 10,812,576 B1
(45) Date of Patent: Oct. 20, 2020

(54) HARDWARE LOAD BALANCER GATEWAY ON COMMODITY SWITCH HARDWARE

(71) Applicant: Microsoft Technology Licensing, LLC, Redmond, WA (US)

(72) Inventors: Lihua Yuan, Bellevue, WA (US); Ashok Kumar Nandoori, Sammamish, WA (US); Pradeepkumar Mani, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/428,243

(22) Filed: May 31, 2019

(51) Int. Cl.
*H04L 29/08* (2006.01)
*G06F 9/50* (2006.01)
(Continued)

(52) U.S. Cl.
CPC .......... *H04L 67/101* (2013.01); *G06F 9/5077* (2013.01); *G06F 9/5083* (2013.01); *H04L 45/24* (2013.01); *H04L 45/306* (2013.01); *H04L 45/38* (2013.01); *H04L 45/7453* (2013.01); *H04L 47/803* (2013.01); *H04L 61/2564* (2013.01); *H04L 67/1097* (2013.01); *G06F 2209/5011* (2013.01); *H04L 61/6009* (2013.01)

(58) Field of Classification Search
CPC . H04L 67/101; H04L 67/1097; H04L 41/084; H04L 41/16; H04L 41/50; H04L 45/24; H04L 45/306; H04L 45/38; H04L 45/7453; H04L 47/803; G06F 9/5077; G06F 9/5083

USPC ................................................. 709/219, 226
See application file for complete search history.

(56) References Cited

U.S. PATENT DOCUMENTS

| 8,959,215 | B2 * | 2/2015 | Koponen | ................ H04L 49/70 709/225 |
| 10,075,377 | B1 * | 9/2018 | Sharma | ................ H04L 47/125 |

(Continued)

OTHER PUBLICATIONS

Kiran, et al., "Cisco Open Network Environment: Bring the Network Closer to Applications", Published in White Paper of Cisco, Sep. 2015, 14 Pages.

(Continued)

*Primary Examiner* — Tauqir Hussain
(74) *Attorney, Agent, or Firm* — Mark K. Young; Mayer & Williams, PC

(57) ABSTRACT

A Top of Rack (TOR) switch operating with a Software for Open Networking in the Cloud (SONiC) platform is implemented using commodity switch hardware and is configured to maintain or retrieve flow state information for incoming data flows in a load balancer. In one embodiment, an application-specific integrated circuit (ASIC) informs a user mode container flow state information for each incoming data flow. The user mode container informs the ASIC of any affected flows that may result pursuant to a modified distributed system (e.g., added, updated, or removed servers). In other embodiments, the ASIC may utilize remote direct memory access (RDMA) to retrieve flow state information maintained by a remote device or may utilize the RDMA to retrieve network address translation (NAT) information for incoming traffic. In each of the implementations, the integrity of the load balancing system is maintained when the distributed system of servers changes.

20 Claims, 16 Drawing Sheets

(51) Int. Cl.
*H04L 29/12* (2006.01)
*H04L 12/743* (2013.01)
*H04L 12/721* (2013.01)
*H04L 12/725* (2013.01)
*H04L 12/927* (2013.01)
*H04L 12/707* (2013.01)

(56) References Cited

U.S. PATENT DOCUMENTS

| | | | | |
|---|---|---|---|---|
| 10,469,389 | B1* | 11/2019 | Sharma | H04L 67/1014 |
| 10,574,699 | B1* | 2/2020 | Baer | H04L 63/123 |
| 2010/0036903 | A1 | 2/2010 | Ahmad et al. | |
| 2012/0155266 | A1 | 6/2012 | Patel et al. | |
| 2014/0059111 | A1* | 2/2014 | Veeraiyan | H04L 12/4633 709/201 |
| 2015/0271075 | A1* | 9/2015 | Zhang | H04L 47/125 370/235 |
| 2015/0317169 | A1 | 11/2015 | Sinha et al. | |
| 2015/0358401 | A1* | 12/2015 | Flavel | H04L 61/1511 370/235 |
| 2016/0323197 | A1* | 11/2016 | Guzman | H04L 47/726 |
| 2017/0093724 | A1* | 3/2017 | Bansal | H04L 41/0896 |
| 2017/0279722 | A1* | 9/2017 | Amulothu | H04L 47/125 |
| 2017/0346897 | A1* | 11/2017 | Gahm | H04L 67/32 |
| 2018/0034686 | A1* | 2/2018 | Vaidyanathan | H04L 69/16 |
| 2018/0176153 | A1* | 6/2018 | Reumann | H04L 47/125 |
| 2018/0205785 | A1* | 7/2018 | Caulfield | H04L 67/10 |
| 2018/0218007 | A1* | 8/2018 | Wells | H04L 67/06 |
| 2018/0241809 | A1 | 8/2018 | Gandhi et al. | |
| 2018/0262427 | A1* | 9/2018 | Jain | H04L 12/4633 |
| 2019/0238363 | A1* | 8/2019 | Boutros | H04L 45/34 |

OTHER PUBLICATIONS

Lizuka, et al., "Large Memory Embedded ASICs", In the Proceedings of IEEE International Conference on Computer Design, Oct. 3, 1988, pp. 292-295.

Raveh, Aviad, "SONiC is making Open Ethernet a dream come true", Retreived From:http://www.mellanox.com/blog/2018/10/sonic-open-ethernet-dream-come-true/, Oct. 15, 2018, 3 Pages.

Lopez, et al., "Whitebox Flavors in Carrier Networks", In Proceedings of Optical Fiber Communications Conference and Exhibition, Mar. 3, 2019, 3 Pages.

"International Search Report and Written Opinion issued in PCT Application No. PCT/US20/029169", dated Jul. 30, 2020, 18 pages.

* cited by examiner

1200

HARDWARE LOAD BALANCER GATEWAY ON COMMODITY SWITCH HARDWARE

BACKGROUND

Servers set up as part of a distributed system can host data such as dynamic web applications and websites, to which load balancers can direct incoming traffic. In some implementations, data flows from the load balancers to the servers can be affected when a server is added, updated, or removed from the distributed system due to the utilization of a consistent hash to organize the data on the servers. In addition, a bottleneck for the load balancers can occur at the multiplexer (MUX) which processes inbound network traffic and maps virtual Internet Protocol (IP) addresses, which are exposed to the public, to dynamic IP addresses where a virtual machine is located.

SUMMARY

A Top of Rack (TOR) switch operating with a Software for Open Networking in the Cloud (SONiC) platform is implemented using commodity switch hardware and is configured to maintain or retrieve flow state information for incoming data flows to a load balancer that is configured to perform load balancing at a switch line rate. In one embodiment, an application-specific integrated circuit (ASIC) informs a user mode container of flow state information for each incoming data flow. The user mode container informs the ASIC of any affected flows that may result pursuant to a modified distributed system (e.g., added, updated, or removed servers). In other embodiments, the ASIC may utilize remote direct memory access (RDMA) to retrieve flow state information maintained by a remote device or may utilize the RDMA to retrieve network address translation (NAT) information for incoming traffic. In each of the implementations, the integrity of the load balancing system is maintained when the distributed system of servers changes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

The SONiC (Software for Open Networking in the Cloud) networking switch software is built on the switch abstraction interface (SAI) which defines a standardized application programming interface (API). Network load balancing is implemented using programmable commodity switch hardware that utilizes SAI to provide a consistent interface to the hardware ASICs (application-specific integrated circuits) that typically have a small memory footprint. Rather than implementing load balancing in a dedicated server or edge router, SONiC is adapted to provide traffic load-balancing as a containerized TOR (Top of Rack) switch by managing flow state transformations as a user mode function for newly affected flows which are routed by the ASIC in the TOR switch.

As new network nodes come online, a hash-based distribution mode is used to map the new flows to the available servers. However, as the hardware load-balancer ASIC has reduced memory resources compared to the SONiC TOR switch (which can run on a comparatively resource-rich platform), flow state for the newly affected flows is maintained by the SONiC user mode. This flow state maintenance enables a low-cost/overhead solution to extend the capabilities of the commodity hardware by shifting some load-balancing responsibilities to the SONiC TOR switch. As the DIP (destination IP) pool changes, for example, due to demand elasticity or network maintenance, the SONiC TOR switch enables the commodity load-balancing hardware to handle the new flows. Additional SONiC containers can also be added in the same chassis/rack to provide some scalability for load-balancing demands.

In an alternative implementation that is highly scalable, SONiC is configured to support RDMA (Remote Direct Memory Access) to provide access to an external memory resource which is adapted to store the calculated hash tables for the distribution mode and/or flow state which can be pushed down to the commodity load-balancing hardware. The ASIC memory can then be utilized for caching. NAT gateway functionality may also be supported in the RDMA implementation by storing the NAT flows and tables in the external memory resource.

Figure 1:
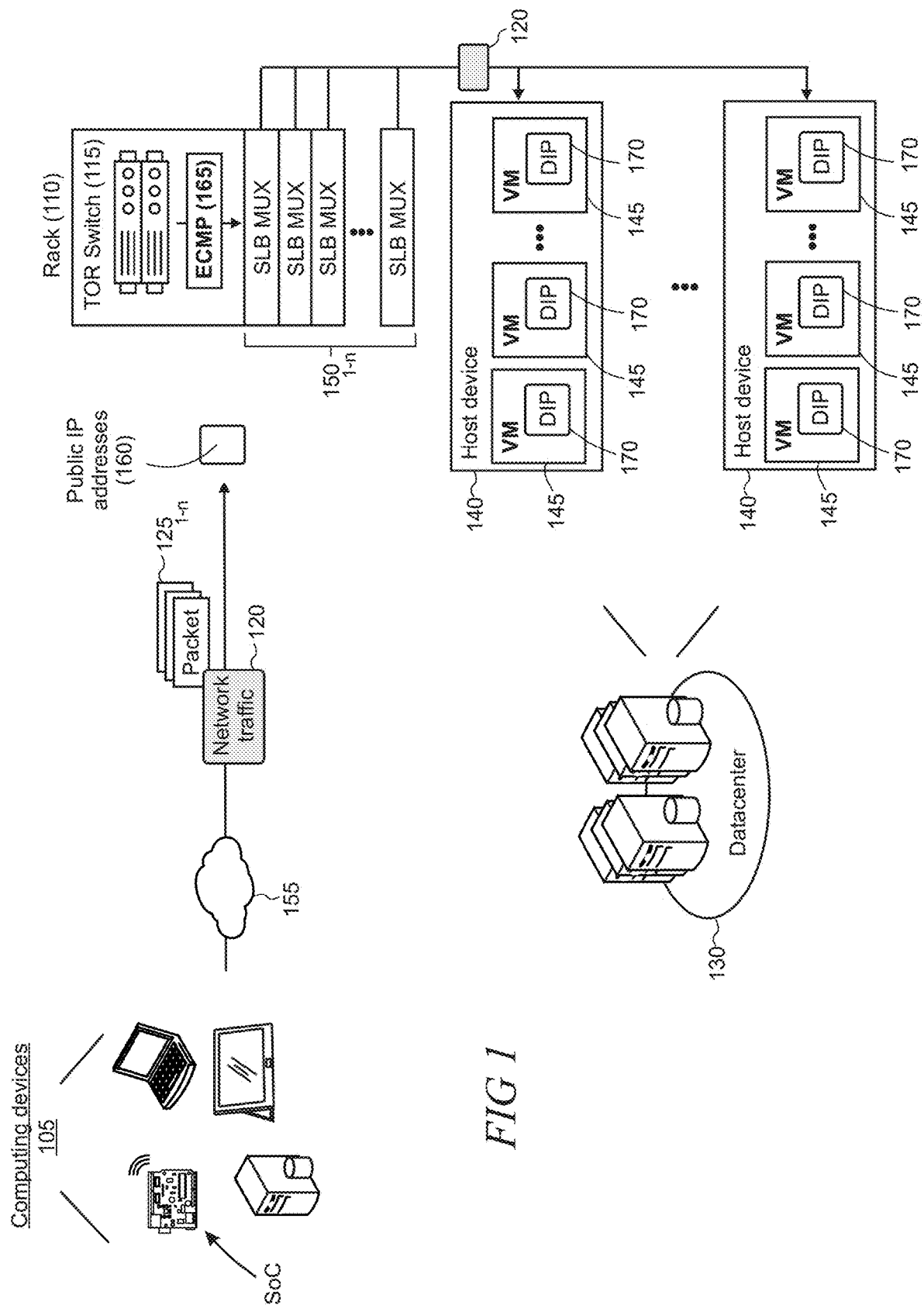
FIG. 1 shows an illustrative environment in which incoming network traffic is processed by a Top of Rack (TOR) switch.

Turning now to FIG. 1 of the drawings, computing devices 105 may transmit network traffic 120, such as the data packets 125, to a datacenter 130 which is comprised of at least host devices 140 and virtual machines 145. A rack 110 may at least include a Top of Rack (TOR) switch 115, servers, and software load balancing (SLB) multiplexers (MUXes) 150 configured to load balance the incoming network traffic to the host devices. The TOR switch can use a hardware load balancer which is configured to perform equal-cost multi-path routing (ECMP) 165 for incoming data packets to the host devices. The network 155 may be comprised of any one or more of a local area network, wide area network, the Internet, and the World Wide Web.

SLB is utilized to evenly distribute tenant and tenant customer network traffic among virtual network resources using software defined networking (SDN). SLB maps virtual IP addresses (VIPs), which may be the public IP addresses 160 exposed to customer computing devices 105, to dynamic IP addresses (DIPs) 170 that are part of a cloud service set of resources in the datacenter 130. In typical implementations, VIPs are single IP addresses that provide public access to a pool of load balanced virtual machines 145. For example, VIPs are IP addresses that are exposed on the Internet so that tenants and tenant customers operating the computing devices 105 can connect to tenant resources in the cloud datacenter. DIPs 170 are the IP addresses of the member virtual machines of a load balanced pool behind the VIP. DIPs are assigned within the cloud infrastructure to the tenant resources.

FIG. 1 shows an illustrative environment in which a computing device 105 transmits data packets 125 destined for a host device 140 in the datacenter 130 and the data packets 125 are intercepted by the TOR switch 115. The data packets traverse over a data flow 205 (FIG. 2) which may be, for example, a TCP/IP (transmission control protocol/internet protocol) connection. While a TOR switch is depicted in the figures for clarity in exposition, the switch may be positioned in various locations relative to the servers on which it operates. For example, the switch may be an End of Row (EOR) switch or be positioned in the middle of or at other locations within the rack 110. Furthermore, the switch may be a router or other networking/gateway device having at least some of the functionality described herein to maintain or access and retrieve flow state information. The TOR switch, for example, may include commodity hardware operable to perform hardware load balancing and is configured as shown abstractly in FIG. 2.

Figure 2:
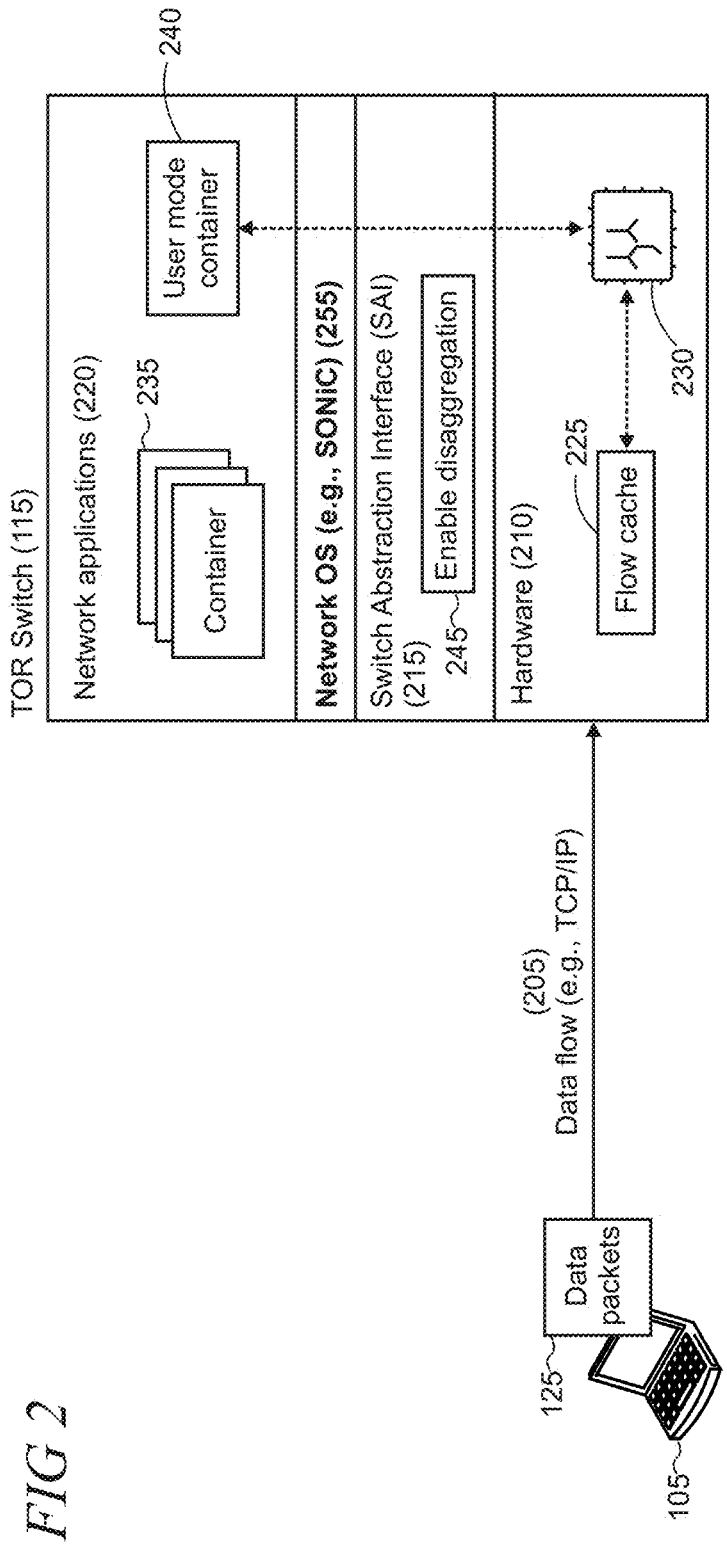
FIG. 2 shows an illustrative environment in which an application-specific integrated circuit (ASIC) is in communication with at least a user mode container and flow cache.

FIG. 2 shows a simplified layered architecture of the components of a TOR switch 115, such as a line card or backplane, in which the component includes at least a hardware layer 210, a switch abstraction interface (SAI) layer 215, and a network applications layer 220. Although not shown, in typical implementations, other layered components may be utilized with the TOR switch 115, such as a kernel space for an ASIC driver and a user space for an ASIC SDK (software development kit).

The hardware layer can include an application-specific integrated circuit (ASIC) 230 and flow cache 225 which may be, for example, an L1 or L2 cache associated with the ASIC. The flow cache can store, for example, flow state information including source IP, source port, destination IP, destination port, and the protocol used. Collectively, the flow state information can identify a data flow for incoming network traffic. ASIC may be configured as a hardware load balancer on the TOR switch to calculate or otherwise determine how to distribute data packets to the virtual machines on the host devices, such as using consistent hash as discussed in greater detail below. The ASIC is also configured to perform ECMP 165 which also enables execution of load balancing tasks that may be typically performed by the software load balancers (e.g., SLB MUX) to be transferred to the TOR switch 115. This can save resources for the SLB MUX and thereby increase its bandwidth and throughput.

The switch abstraction interface layer 215 can provide a standard interface which enables integration between—and disaggregation from—the commodity hardware and commodity software components with the network applications layer 220, such as the containers 235 and user mode container 240, as representatively shown by numeral 245. The SAI may include a set of application programming interfaces (API) to facilitate communication between the containers and other network applications on the network operating system and the commodity hardware.

The networking applications may operate using a network operating system (OS) 255, such as the Software for Open Networking in the Cloud (SONiC) platform based on Linux®. Other hardware components can be utilized by the TOR switch 115, in addition to the ASIC hardware, on which the network applications operate. For example, a separate processor, like a CPU (central processing unit), and hardware-based memory device (e.g., random access memory (RAM) or other flash memory) may be utilized by the TOR switch 115 to perform the application and operating system functions associated with the network applications layer 220. The flow cache 225 and any other memory associated with the ASIC 230 is typically configured with a small memory footprint to perform discrete operations. The additional hardware utilized for the containers and user mode applications enable performance of additional system operations relative to the ASIC's hardware load balancing functionality.

The network applications layer 220 may be instantiated on the network OS 255 and include containers 235 which can include network applications and management tools which provide users with control over the operations of the commodity-based networking device. The user mode container 240 can maintain flow state information that is received from the ASIC so that the TOR switch 115 maintains awareness of data flow forwarding operations and information. The ASIC 230 is configured to communicate with the user mode container to transmit the flow state information, as illustratively shown by the double arrow.

Figure 3:
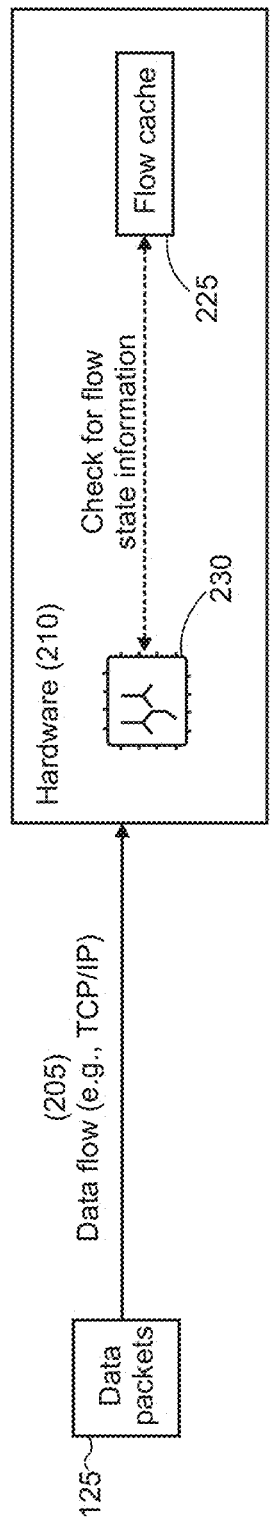
FIG. 3 shows an illustrative environment in which the ASIC checks for flow state information in the flow cache.

FIG. 3 shows an illustrative environment in which the TOR switch 115 receives data packets 125 over the data flow 205. The ASIC 230 receives the data packets and checks the flow cache 225 for flow state information that corresponds to the incoming data flow 205. If corresponding data flow information exists, then the ASIC routes the data according to the flow state information contained in the flow cache.

Figure 4:
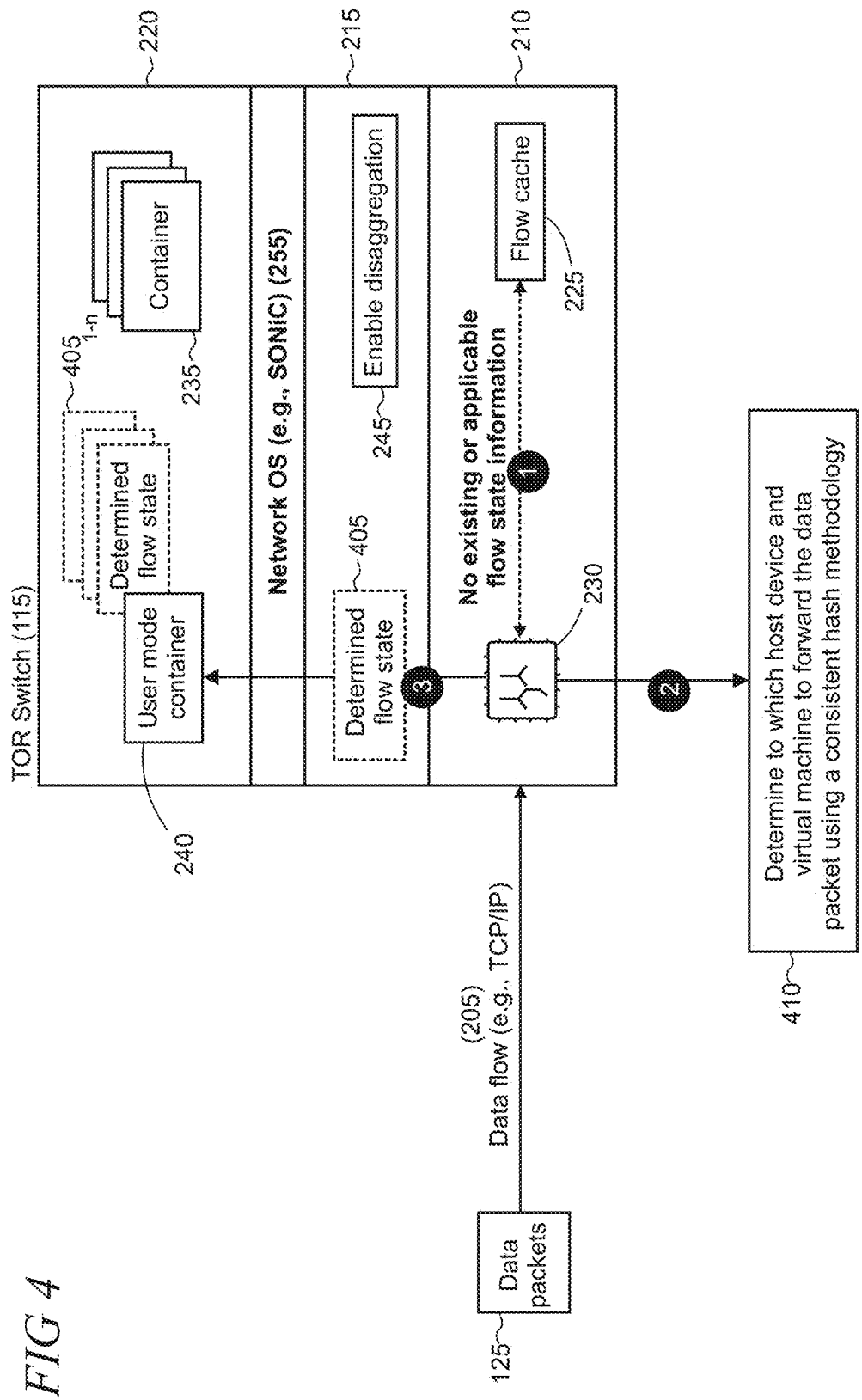
FIG. 4 shows an illustrative environment in which the ASIC determines and informs flow state information to the user mode container.

FIG. 4 shows an illustrative environment in which the ASIC 230 performs some operations responsively to no existing or applicable flow state information within the flow cache 225 being available. The ASIC determines to which host device and virtual machine to forward the incoming data packets using consistent hash methodology, as representatively shown by numeral 410, and may further utilize ECMP for routing the data packets. Transferring some of the gateway functionality to the ASIC from other components in the SLB environment, such as the SLB MUX, can reduce some of the workload on the SLB MUX and thereby relieve its choking point to improve overall system performance.

Consistent hashing is a distributed hashing methodology that utilizes an abstract circle having 360° to allow servers and objects to scale without affecting the overall system. The consistent hashing principles operate independently of the number of servers or objects in a distributed hash table to thereby enable elasticity of demand or maintenance on servers without affecting the entire distributed system. The ASIC is configured to perform consistent hashing to route data packets to the correct virtual machines and host device.

The ASIC uses the SAI 215 to communicate with the user mode container. The ASIC synchronously transfers the determined flow state 405 for the data flow 205 to the user mode container 240. The user mode container stores the received determined flow state information in the memory device associated with the network applications layer 220, to thereby maintain a list of flow state information for incoming flows.

Figure 5:
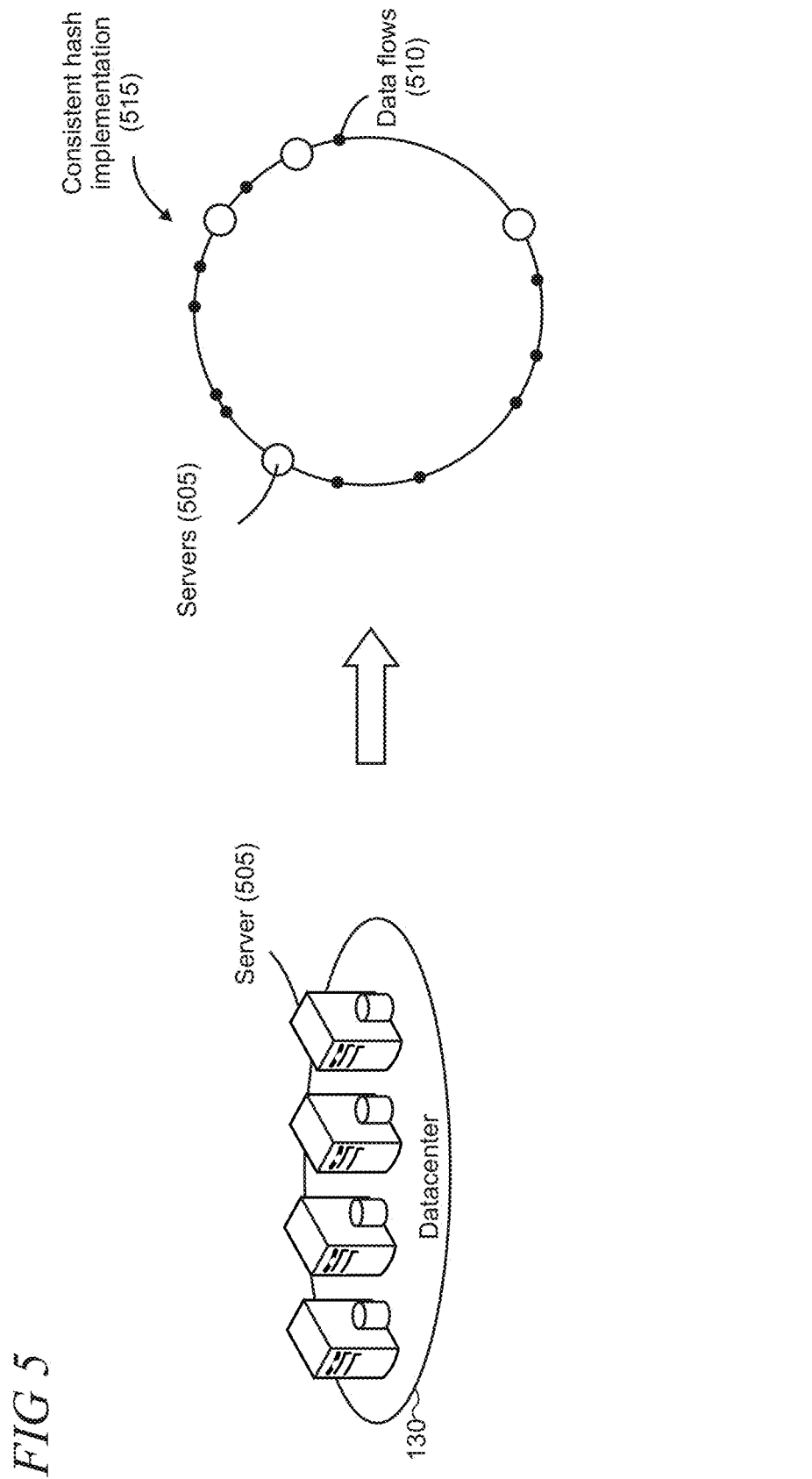
FIG. 5 shows an illustrative environment of a consistent hash implementation of a datacenter.

FIG. 5 shows an illustrative environment of a datacenter 130 and an abstraction of the servers 505 and data flows 510 on a circle having 360° which represents a consistent hash implementation 515 for data objects. In typical implementations, the data flows or objects on the circle belong to a unique server in the datacenter 130 (FIG. 1) based on the placement of the data flow on the circle. For example, data flows or objects may belong to a first server encountered when tracing counterclockwise from the data flow, but other configurations and use of the consistent hash methodology are also possible.

Figure 6:
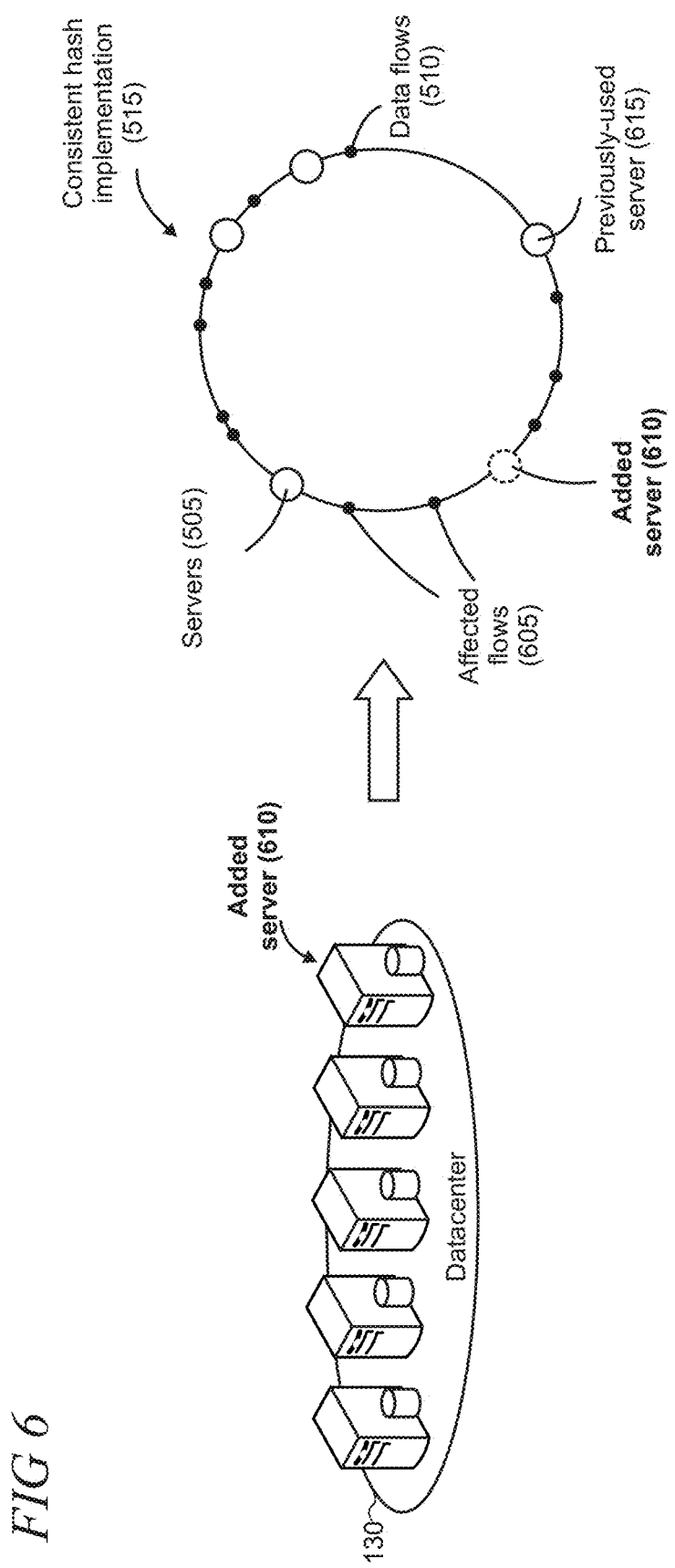
FIG. 6 shows an illustrative environment of an updated consistent hash implementation after adding a server to the datacenter.

FIG. 6 shows an illustrative environment in which the datacenter 130 adds a server 610 which affects the consistent hash calculation for at least part of the data flows. For example, relative to FIG. 5, the addition of server 610 affects data flows 605 because the added server is now the first server that the affected data flows encounter when tracing counterclockwise on the circle. The affected data flows, according to consistent hash, belong to the added server 610 instead of the previously used server 615. The affected data flows or objects can thereby cause data storage issues when components of the system (e.g., the servers and networking devices) determine where data objects belong. If the TOR switch continues sending data to the previously used server when the updated consistent hash indicates certain data objects belong to the added server, then data errors can occur which could damage the integrity of the system. While an added server is illustrated in FIG. 6, other modifications to the distributed system can also affect data flows when using consistent hash, such as removing or updating a server, placing a server temporarily offline, or providing maintenance on servers.

Figure 7:
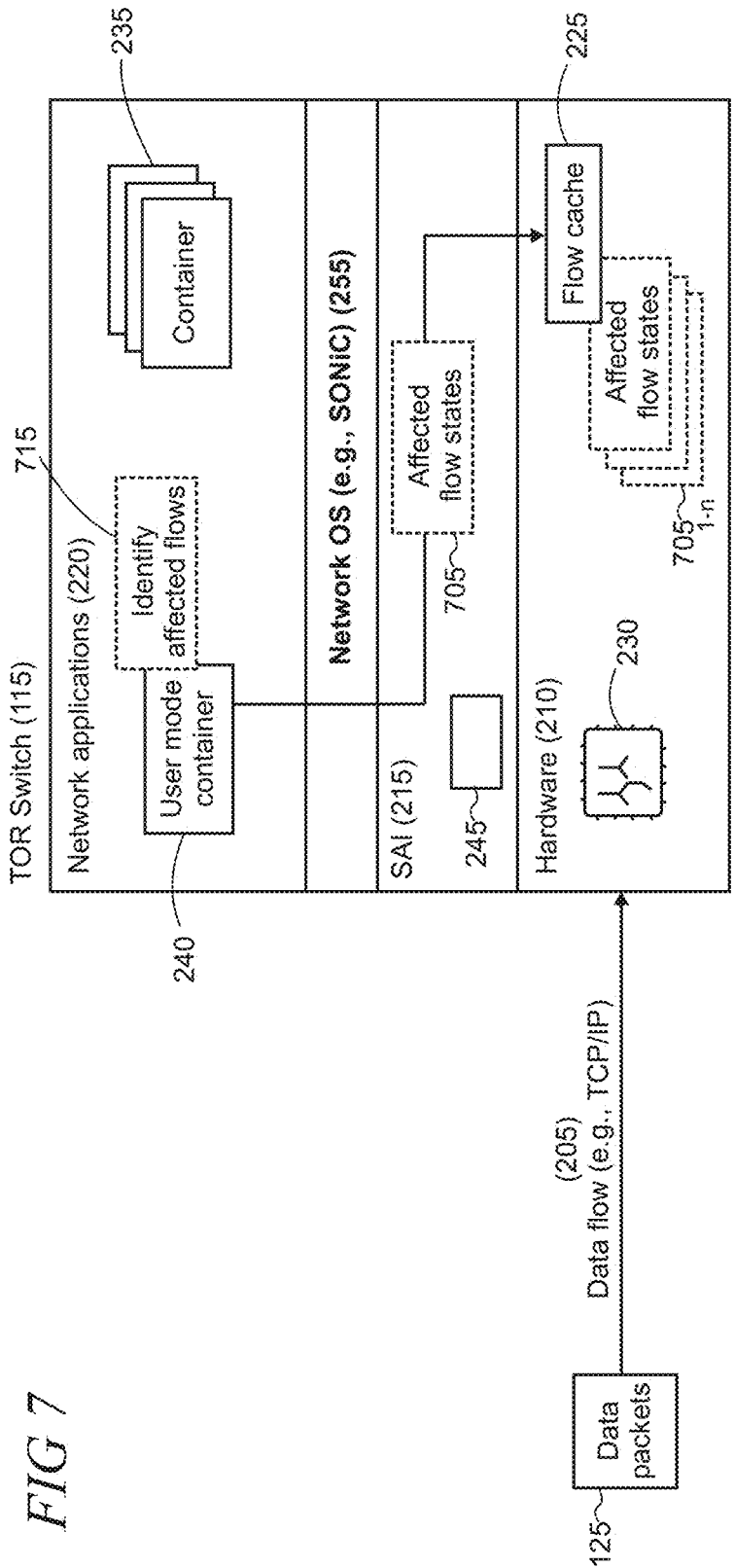
FIG. 7 shows an illustrative environment in which the user mode container transmits information pertaining to the affected data flows to the ASIC's flow cache.

FIG. 7 shows an illustrative environment in which the user mode container 240 is aware of the change to the distributed system (FIG. 6) and identifies the affected flows 715. The user mode container of the TOR switch 115 may be informed of the changes to the distributed system based on input from a user that has remote control over the switch's operations. For example, a system administrator can inform all devices in the system of a datacenter change. The user mode container can identify the affected flow states by performing a consistent hash calculation and using the flow state information received from the ASIC (FIG. 4). That is, the user mode container can calculate the consistent hash for the updated system and identify which flows received from the ASIC are affected by the updated system.

Since only a portion of the flows are affected after a modification to the distributed system, the user mode container pushes information identifying the affected flow states 705 to the flow cache 225. Storing the affected flow states instead of all possible flow states is ideal given the small memory footprint typically associated with the ASIC. The ASIC checks the flow cache 225 for each incoming data flow before using consistent hash to determine the distribution path (FIGS. 3 and 4), thereby enabling the ASIC to correctly route data flows and accommodate the elasticity of demand or server maintenance.

Figure 8A:
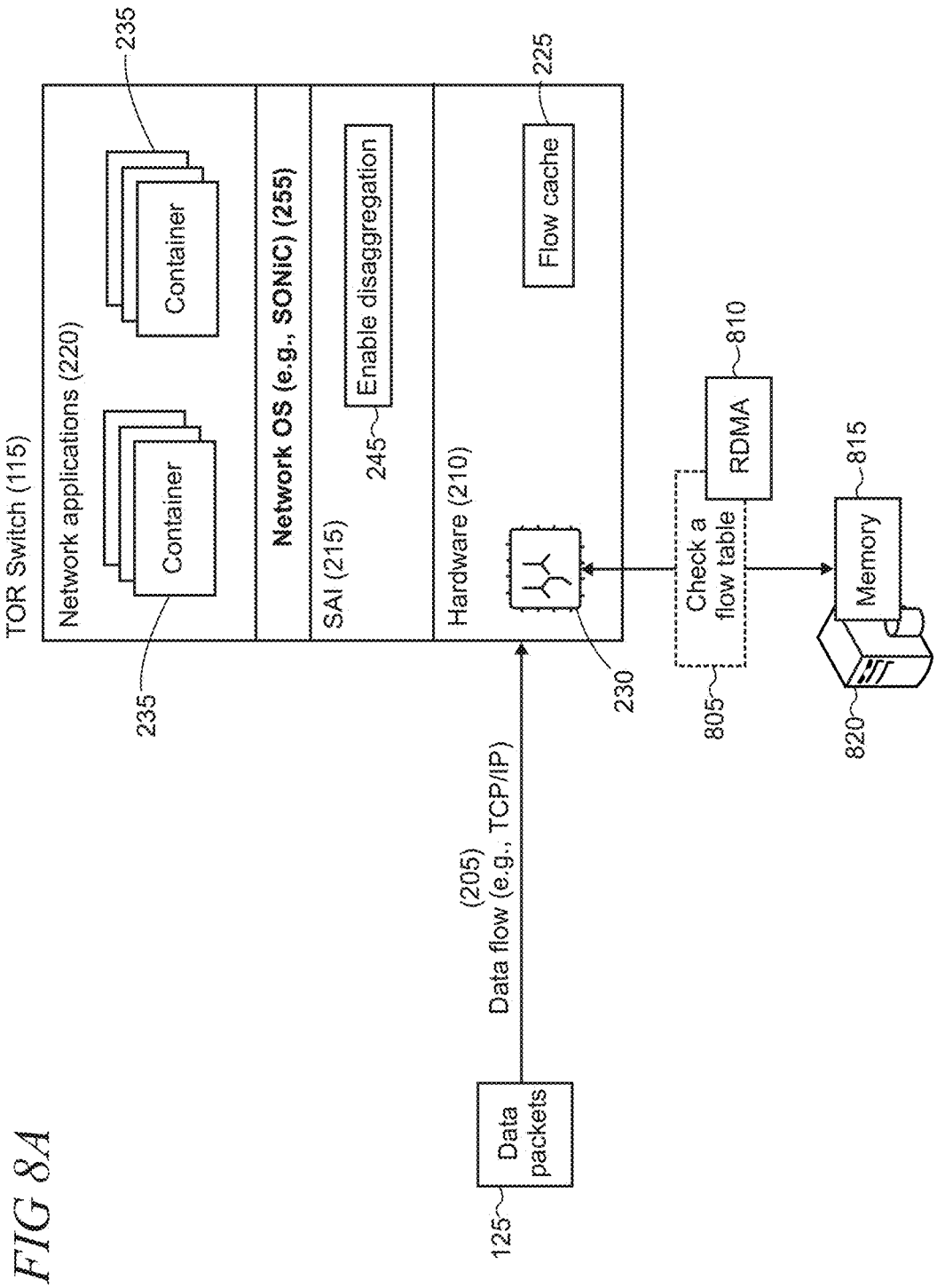
FIG. 8A shows an illustrative environment in which the ASIC checks a flow table using remote direct memory access (RDMA) to memory resource.

FIG. 8A shows an alternative embodiment in which the ASIC 230 utilizes remote direct memory access (RDMA) 810 to external memory 815 of a remote computing device 820 to check a flow table 805. The utilization of an external memory resource can provide increased scalability because the external source does not face hardware (e.g., memory) constraints as the TOR switch. The flow table may store relevant information for multiple data flows (affected or not) to enable the ASIC to direct data flows to the correct host devices each time a new TCP/IP connection is established. The remote computing device 820 may keep the memory 815 up to date to reflect any modifications (e.g., additions, updates, removals) to the distributed system. If there is no stored or applicable flow state information to the data flow 205, then the ASIC determines the routing for the data flow, such as using consistent hash.

Utilization of the RDMA protocol enables removal of data copy operations and enables reduction in latencies by allowing an application on the TOR switch 105 to read data on a remote server's or device's memory with minimal demands on memory bus bandwidth and CPU processing overhead, while preserving memory protection semantics. The RDMA protocol is described in the RFC 5040 specification published by the Internet Engineering Task Force (IETF) and is built on the direct data placement (DDP) protocol as described in the RFC 5041 specification.

Figure 8B:
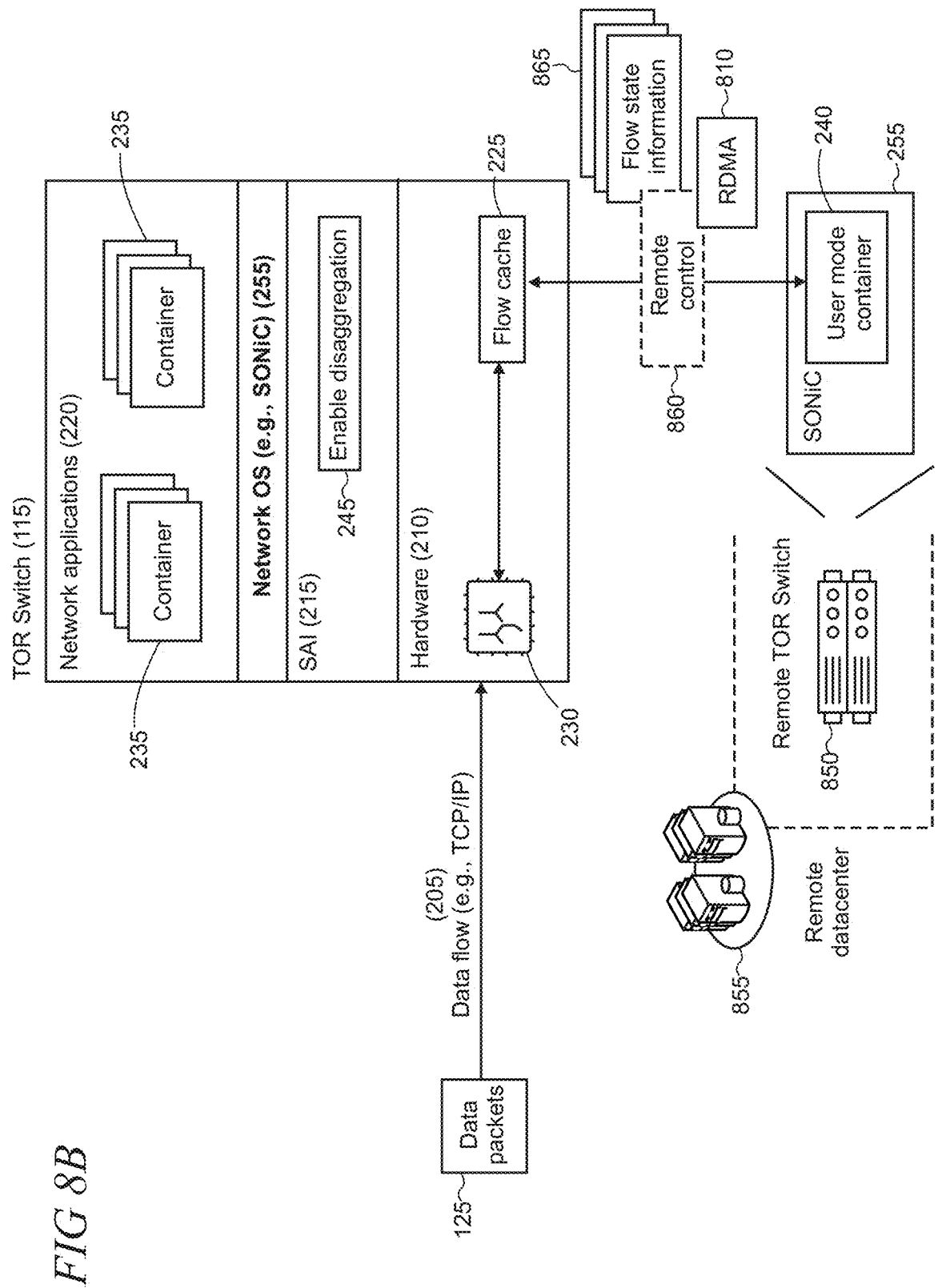
FIG. 8B shows an illustrative environment in which a remote switch, using RDMA, manages the flow information for the TOR switch's ASIC.

FIG. 8B shows an illustrative environment in which a remotely instantiated user mode container 240 is configured to remotely control the local TOR switch 115, as representatively shown by numeral 860. The remote user mode container may be instantiated at a remote TOR switch 850 operating externally, such as within a remote datacenter 855. The remote TOR switch can utilize RDMA 810 to transmit flow state information 865, which can include current and affected flow information, to the flow cache 225 for utilization by the ASIC 230. The remote implementation can increase scalability and performance by preventing bottleneck scenarios which can occur in local CPU scenarios.

Figure 9:
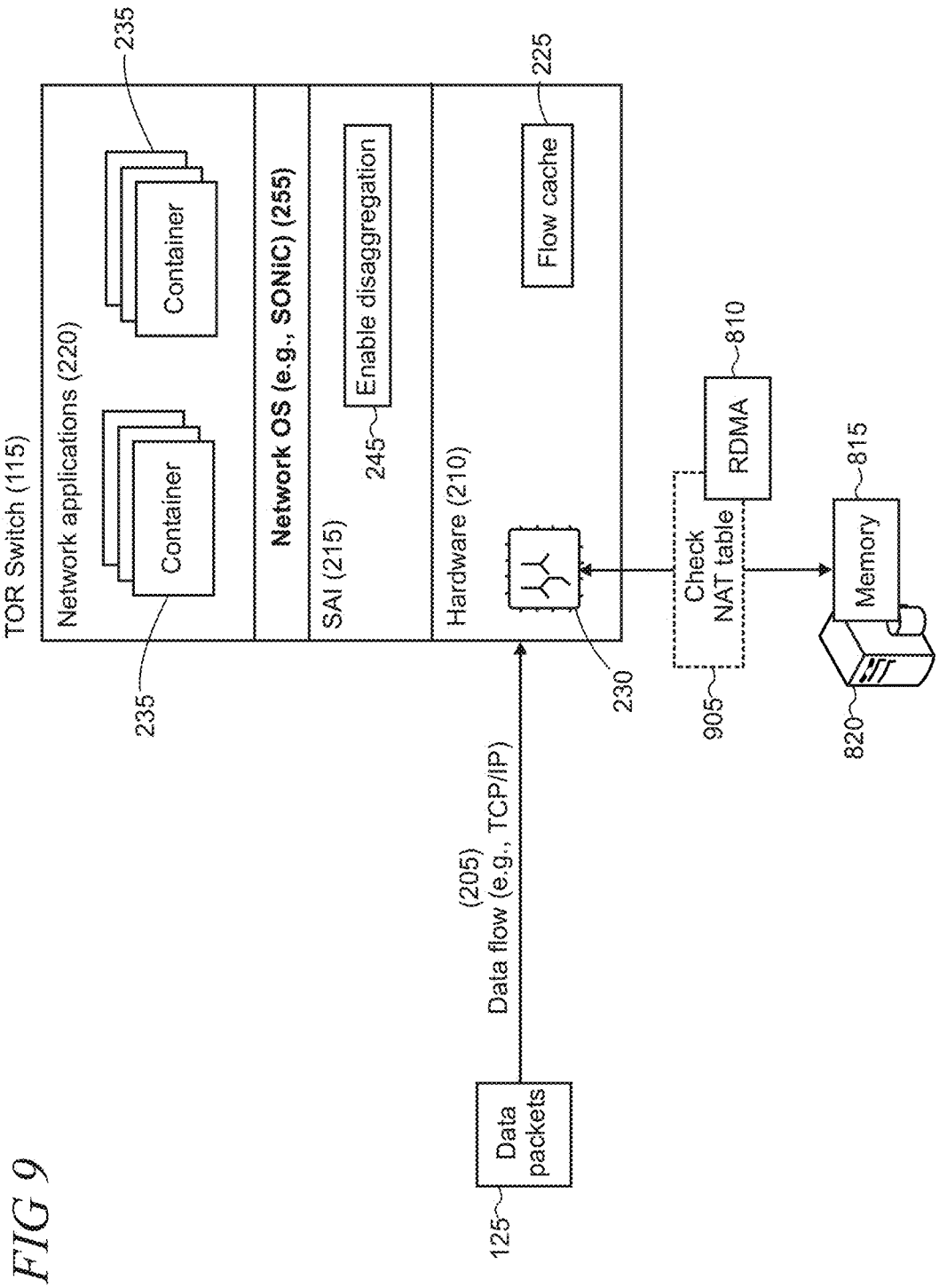
FIG. 9 shows an illustrative environment in which the ASIC checks a network address translation (NAT) table using RDMA to a remote device.

FIG. 9 shows an alternative embodiment in which the ASIC 230 utilizes RDMA to the external memory 815 of the remote computing device 820 to check a network address translation (NAT) table 905 to perform NAT functionality. Using the external memory enables the expansive information to be stored and accessed by the ASIC to perform the NAT routing. The NAT can be used to retrieve private IP addresses, among other information, for each virtual machine to which incoming flows can be distributed. The ASIC can retrieve this information using RDMA from the external memory to route the data packets. As changes to the datacenter configuration (e.g., adding or removing servers) can affect the NAT table, using the external memory resource enables the ASIC to maintain and access information to appropriately route data packets. Using RDMA for either the flow table or the NAT table can advantageously provide greater memory resources to the TOR switch 115 and thereby prevent a bad actor from potentially taking advantage of the small amount of memory footprint typically associated with ASICs.

Figure 10:
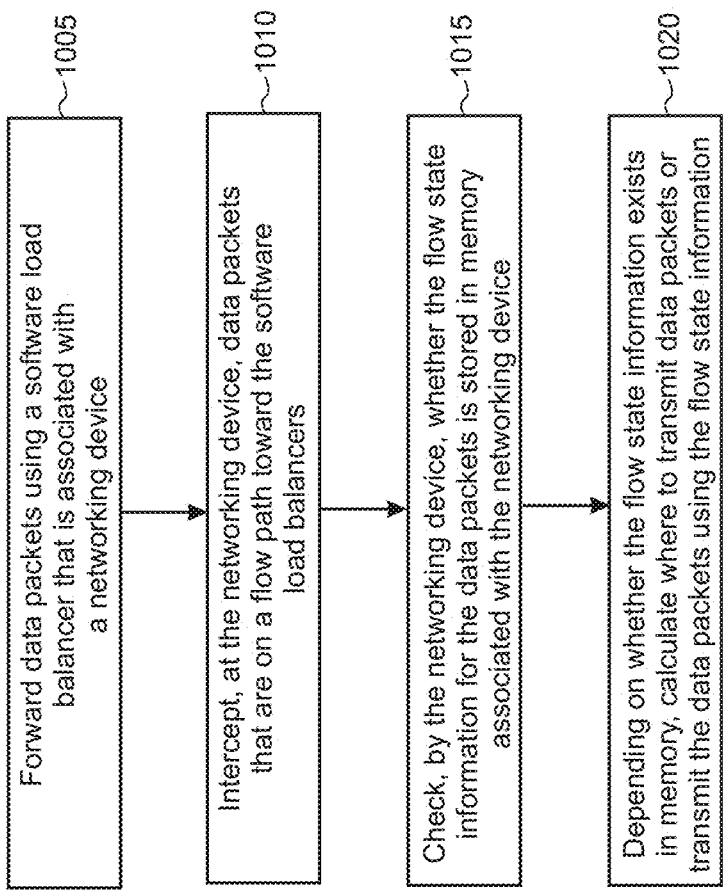
FIGS. 10-12 are flowcharts of illustrative methods performed by one or more computer servers within a datacenter.
Figure 11:
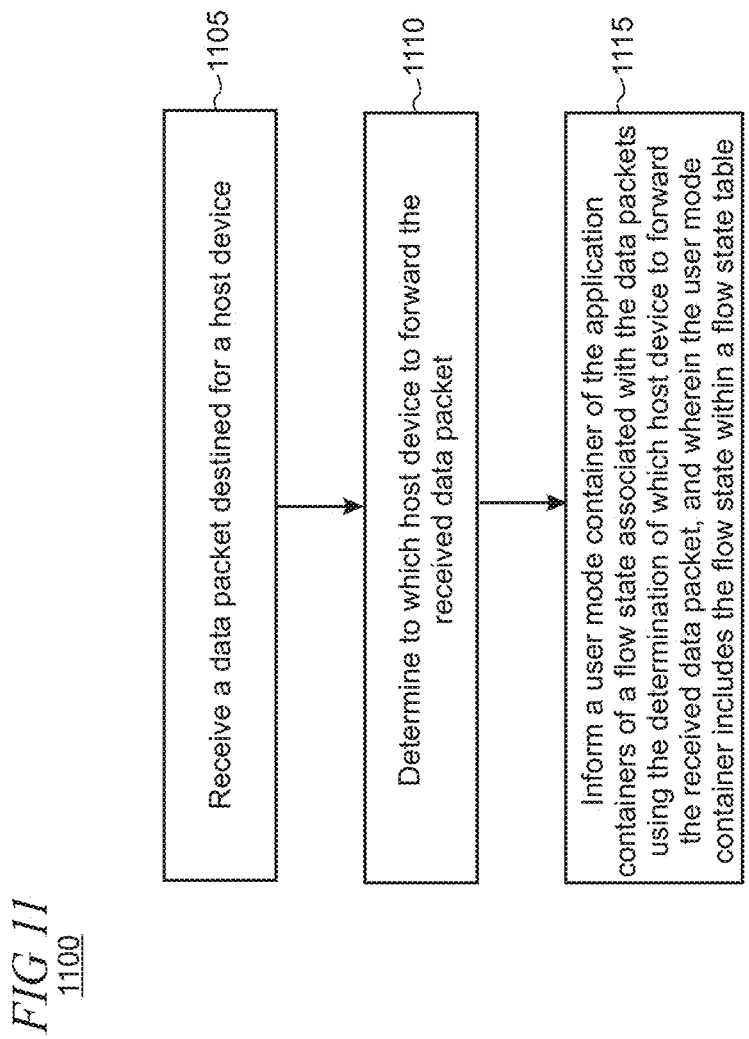
Figure 12:
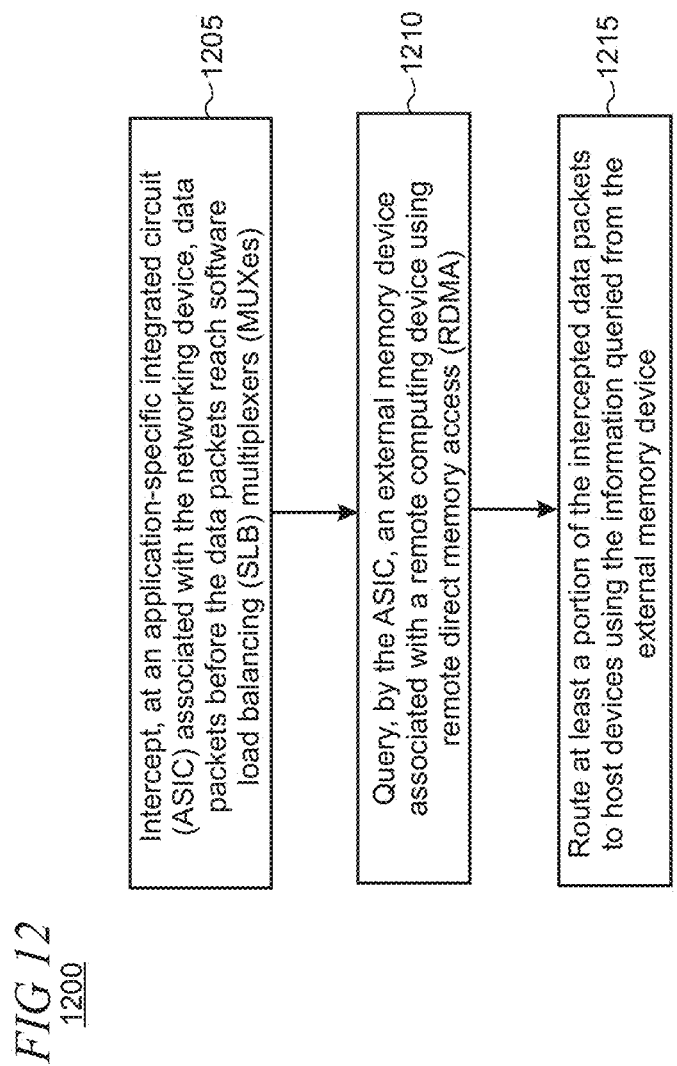

FIGS. 10-12 are flowcharts of illustrative methods 1000, 1100, and 1200, that may be performed using a networking device, such as the TOR switch 115 or a router. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1005, in FIG. 10, the networking device load balances data packets using a load balancer that is associated with the networking device. In step 1010, the networking device intercepts data packets that are on a flow path toward the load balancers. In step 1015, the networking device checks whether the flow state information for the data packets is stored in memory associated with the networking device. In step 1020, the networking device, depending on whether the flow state information exists in memory, calculates where to transmit data packets or transmits the data packets using the flow state information.

In step 1105, in FIG. 11, the networking device receives data packets that are destined for a host device. In step 1110, the networking device determines to which host device to forward the received data packet. In step 1115, the networking device informs a user mode container of application containers of a flow state associated with the data packets using the determination of which host device to forward the received data packet, wherein the user mode container includes the flow state within a flow state table.

In step 1205, in FIG. 12, an application-specific integrated circuit (ASIC) associated with a networking device intercepts data packets before the data packets reach software load balancing (SLB) multiplexers (MUXes). In step 1210, the ASIC queries an external memory device associated with a remote computing device using remote direct memory access (RDMA). In step 1215, the ASIC routes at least a portion of the intercepted data packets to host devices using the information queried from the external memory device.

Figure 13:
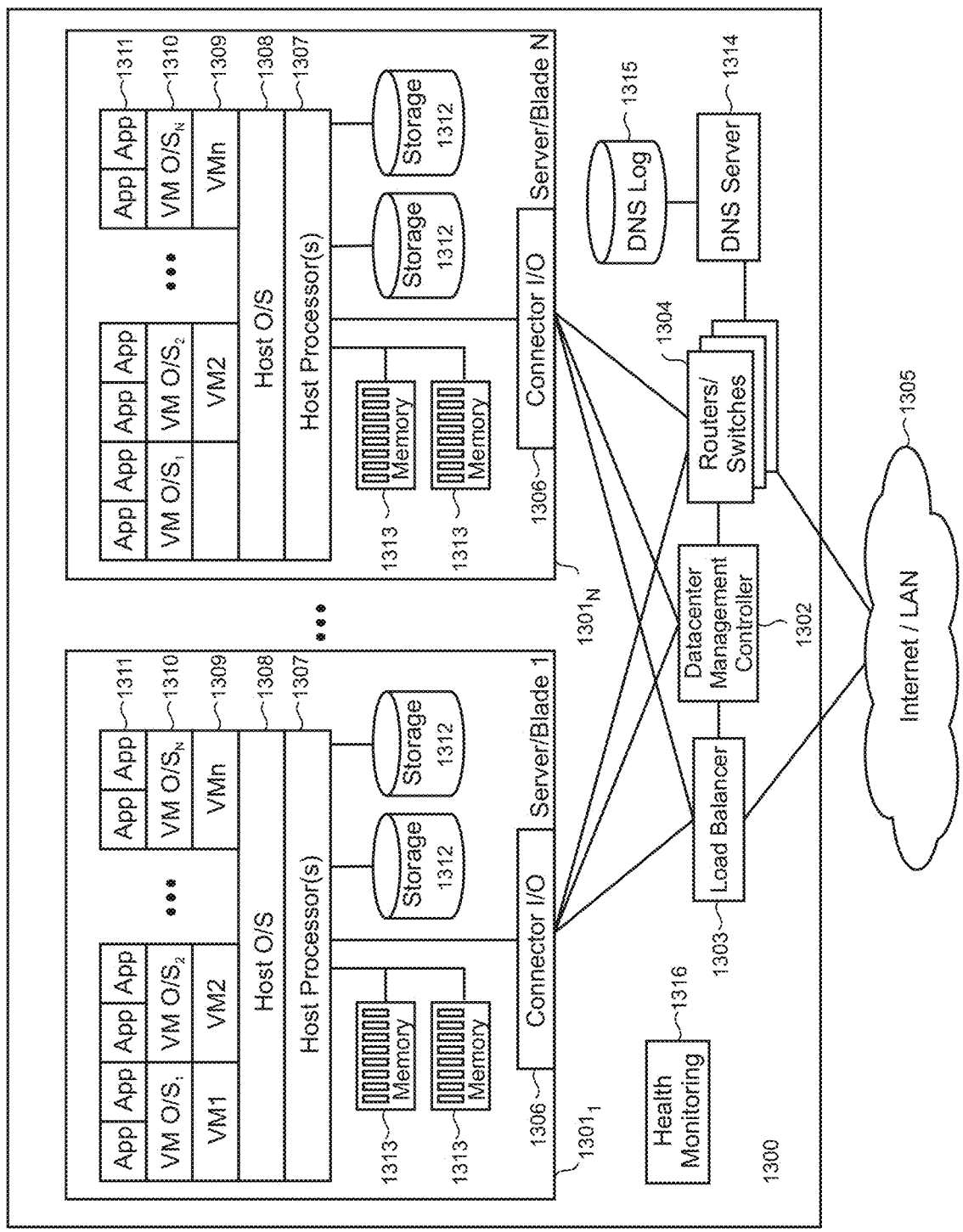
FIG. 13 is a block diagram of an illustrative datacenter that may be used at least in part to implement the present hardware load balancer gateway on commodity switch hardware.

FIG. 13 is a high-level block diagram of an illustrative datacenter 1300 that provides cloud computing services or distributed computing services that may be used to implement the present hardware load balancer gateway on commodity switch hardware. A plurality of servers 1301 are managed by datacenter management controller 1302. Load balancer 1303 distributes requests and computing workloads over servers 1301 to avoid a situation wherein a single server may become overwhelmed. Load balancer 1303 maximizes available capacity and performance of the resources in datacenter 1300. Routers/switches 1304 support data traffic between servers 1301 and between datacenter 1300 and external resources and users (not shown) via an external network 1305, which may be, for example, a local area network (LAN) or the Internet.

Servers 1301 may be standalone computing devices, and/or they may be configured as individual blades in a rack of one or more server devices. Servers 1301 have an input/output (I/O) connector 1306 that manages communication with other database entities. One or more host processors 1307 on each server 1301 run a host operating system (O/S) 1308 that supports multiple virtual machines (VM) 1309. Each VM 1309 may run its own O/S so that each VM O/S 1310 on a server is different, or the same, or a mix of both. The VM O/S's 1310 may be, for example, different versions of the same 0/S (e.g., different VMs running different current and legacy versions of the Windows® operating system). In addition, or alternatively, the VM O/S's 1310 may be provided by different manufacturers (e.g., some VMs running the Windows® operating system, while other VMs are running the Linux® operating system). Each VM 1309 may also run one or more applications (Apps) 1311. Each server 1301 also includes storage 1312 (e.g., hard disk drives (HDD)) and memory 1313 (e.g., RAM) that can be accessed and used by the host processors 1307 and VMs 1309 for storing software code, data, etc. In one embodiment, a VM 1309 may employ the data plane APIs as disclosed herein.

Datacenter 1300 provides pooled resources on which customers can dynamically provision and scale applications as needed without having to add servers or additional networking. This allows customers to obtain the computing resources they need without having to procure, provision, and manage infrastructure on a per-application, ad-hoc basis. A cloud computing datacenter 1300 allows customers to scale up or scale down resources dynamically to meet the current needs of their businesses. Additionally, a datacenter operator can provide usage-based services to customers so that they pay for only the resources they use, when they need to use them. For example, a customer may initially use one VM 1309 on server 1301$_1$ to run their applications 1311. When demand for an application 1311 increases, the datacenter 1300 may activate additional VMs 1309 on the same server 1301$_1$ and/or on a new server 1301$_N$ as needed. These additional VMs 1309 can be deactivated if demand for the application later drops.

Datacenter 1300 may offer guaranteed availability, disaster recovery, and back-up services. For example, the datacenter may designate one VM 1309 on server 1301$_1$ as the primary location for the customer's applications and may activate a second VM 1309 on the same or different server as a standby or back-up in case the first VM or server 1301$_1$ fails. Datacenter management controller 1302 automatically shifts incoming user requests from the primary VM to the back-up VM without requiring customer intervention. Although datacenter 1300 is illustrated as a single location, it will be understood that servers 1301 may be distributed to multiple locations across the globe to provide additional redundancy and disaster recovery capabilities. Additionally, datacenter 1300 may be an on-premises, private system that provides services to a single enterprise user or may be a publicly accessible, distributed system that provides services to multiple, unrelated customers or may be a combination of both.

Domain Name System (DNS) server 1314 resolves domain and host names into IP (Internet Protocol) addresses for all roles, applications, and services in datacenter 1300. DNS log 1315 maintains a record of which domain names have been resolved by role. It will be understood that DNS is used herein as an example and that other name resolution services and domain name logging services may be used to identify dependencies.

Datacenter health monitoring 1316 monitors the health of the physical systems, software, and environment in datacenter 1300. Health monitoring 1316 provides feedback to datacenter managers when problems are detected with servers, blades, processors, or applications in datacenter 1300 or when network bandwidth or communications issues arise.

Figure 14:
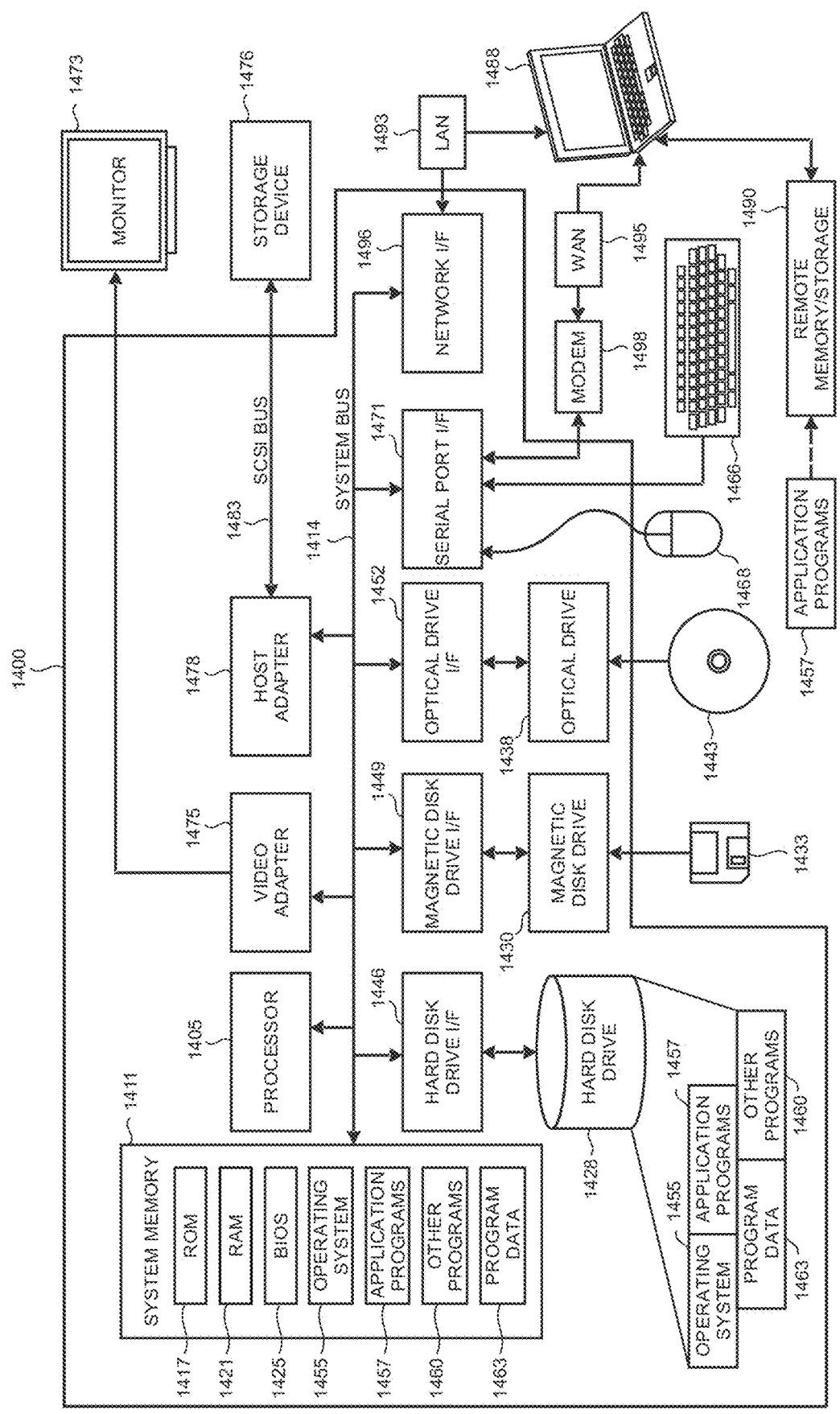
FIG. 14 is a simplified block diagram of an illustrative architecture of a computing device that may be used at least in part to implement the present hardware load balancer gateway on commodity switch hardware.

FIG. 14 is a simplified block diagram of an illustrative computer system 1400 such as a PC or server with which the present hardware load balancer gateway on commodity switch hardware may be implemented. Computer system 1400 includes a processor 1405, a system memory 1411, and a system bus 1414 that couples various system components including the system memory 1411 to the processor 1405. The system bus 1414 may be any of several types of bus structures including a memory bus or memory controller, a peripheral bus, or a local bus using any of a variety of bus architectures. The system memory 1411 includes read only memory (ROM) 1417 and random-access memory (RAM) 1421. A basic input/output system (BIOS) 1425, containing the basic routines that help to transfer information between elements within the computer system 1400, such as during startup, is stored in ROM 1417. The computer system 1400 may further include a hard disk drive 1428 for reading from and writing to an internally disposed hard disk (not shown), a magnetic disk drive 1430 for reading from or writing to a removable magnetic disk 1433 (e.g., a floppy disk), and an optical disk drive 1438 for reading from or writing to a removable optical disk 1443 such as a CD (compact disc), DVD (digital versatile disc), or other optical media. The hard disk drive 1428, magnetic disk drive 1430, and optical disk drive 1438 are connected to the system bus 1414 by a hard disk drive interface 1446, a magnetic disk drive interface 1449, and an optical drive interface 1452, respectively. The drives and their associated computer-readable storage media provide non-volatile storage of computer-readable instructions, data structures, program modules, and other data for the computer system 1400. Although this illustrative example includes a hard disk, a removable magnetic disk 1433, and a removable optical disk 1443, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present hardware load balancer gateway on commodity switch hardware. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1433, optical disk 1443, ROM 1417, or RAM 1421, including an operating system 1455, one or more application programs 1457, other program modules 1460, and program data 1463. A user may enter commands and information into the computer system 1400 through input devices such as a keyboard 1466 and pointing device 1468 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1405 through a serial port interface 1471 that is coupled to the system bus 1414, but may be connected by other interfaces, such as a parallel port, game port, or universal serial bus (USB). A monitor 1473 or other type of display device is also connected to the system bus 1414 via an interface, such as a video adapter 1475. In addition to the monitor 1473, personal computers typically include other peripheral output devices (not shown), such as speakers and printers. The illustrative example shown in FIG. 14 also includes a host adapter 1478, a Small Computer System Interface (SCSI) bus 1483, and an external storage device 1476 connected to the SCSI bus 1483.

The computer system 1400 is operable in a networked environment using logical connections to one or more remote computers, such as a remote computer 1488. The remote computer 1488 may be selected as another personal computer, a server, a router, a network PC, a peer device, or other common network node, and typically includes many or all of the elements described above relative to the computer system 1400, although only a single representative remote memory/storage device 1490 is shown in FIG. 14. The logical connections depicted in FIG. 14 include a local area network (LAN) 1493 and a wide area network (WAN) 1495. Such networking environments are often deployed, for example, in offices, enterprise-wide computer networks, intranets, and the Internet.

When used in a LAN networking environment, the computer system 1400 is connected to the local area network 1493 through a network interface or adapter 1496. When used in a WAN networking environment, the computer system 1400 typically includes a broadband modem 1498, network gateway, or other means for establishing communications over the wide area network 1495, such as the Internet. The broadband modem 1498, which may be internal or external, is connected to the system bus 1414 via a serial port interface 1471. In a networked environment, program modules related to the computer system 1400, or portions thereof, may be stored in the remote memory storage device 1490. It is noted that the network connections shown in FIG. 14 are illustrative and other means of establishing a communications link between the computers may be used depending on the specific requirements of an application of the present hardware load balancer gateway on commodity switch hardware.

Figure 15:
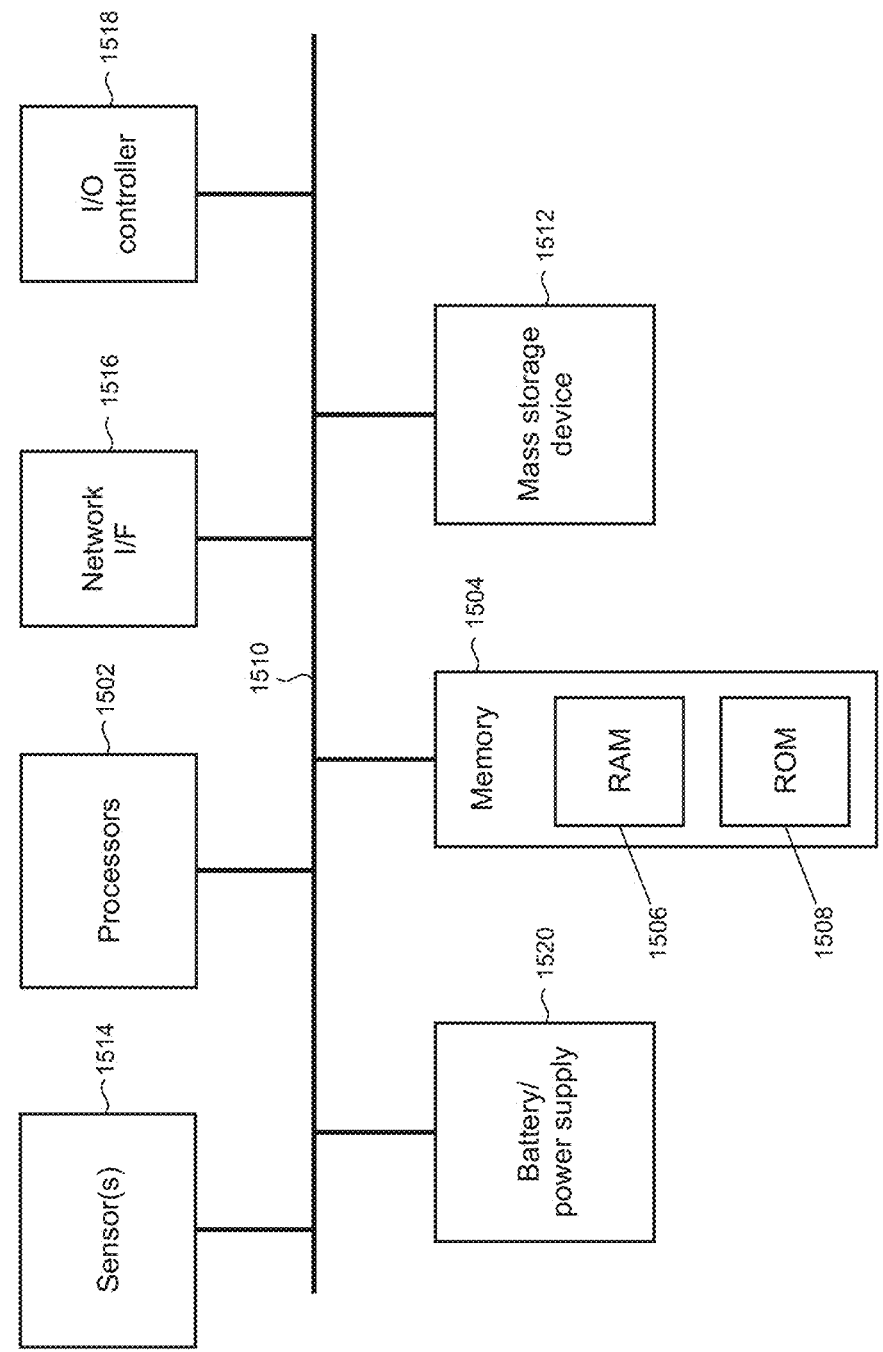
FIG. 15 is a simplified block diagram of an illustrative remote computing device, remote service, or computer system that may be used in part to implement the present hardware load balancer gateway on commodity switch hardware.

FIG. 15 shows an illustrative architecture 1500 for a computing device such as a laptop computer or personal computer that may be used by a customer communicating with the datacenter for the present hardware load balancer gateway on commodity switch hardware. The architecture 1500 illustrated in FIG. 15 includes one or more processors 1502 (e.g., central processing unit, dedicated Artificial Intelligence chip, graphics processing unit, etc.), a system memory 1504, including RAM (random access memory) 1506 and ROM (read only memory) 1508, and a system bus 1510 that operatively and functionally couples the components in the architecture 1500. A basic input/output system containing the basic routines that help to transfer information between elements within the architecture 1500, such as during startup, is typically stored in the ROM 1508. The architecture 1500 further includes a mass storage device 1512 for storing software code or other computer-executed code that is utilized to implement applications, the file system, and the operating system. The mass storage device 1512 is connected to the processor 1502 through a mass storage controller (not shown) connected to the bus 1510. The mass storage device 1512 and its associated computer-readable storage media provide non-volatile storage for the architecture 1500. Although the description of computer-readable storage media contained herein refers to a mass storage device, such as a hard disk or CD-ROM drive, it may be appreciated by those skilled in the art that computer-readable storage media can be any available storage media that can be accessed by the architecture 1500.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray, or other optical storage, magnetic cassette, magnetic tape, magnetic disk storage or other magnetic storage device, or any other medium which can be used to store the desired information and which can be accessed by the architecture 1500.

According to various embodiments, the architecture 1500 may operate in a networked environment using logical connections to remote computers through a network. The architecture 1500 may connect to the network through a network interface unit 1516 connected to the bus 1510. It may be appreciated that the network interface unit 1516 also may be utilized to connect to other types of networks and remote computer systems. The architecture 1500 also may include an input/output controller 1518 for receiving and processing input from a number of other devices, including a keyboard, mouse, touchpad, touchscreen, control devices such as buttons and switches or electronic stylus (not shown in FIG. 15). Similarly, the input/output controller 1518 may provide output to a display screen, user interface, a printer, or other type of output device (also not shown in FIG. 15).

It may be appreciated that the software components described herein may, when loaded into the processor 1502 and executed, transform the processor 1502 and the overall architecture 1500 from a general-purpose computing system into a special-purpose computing system customized to facilitate the functionality presented herein. The processor 1502 may be constructed from any number of transistors or other discrete circuit elements, which may individually or collectively assume any number of states. More specifically, the processor 1502 may operate as a finite-state machine, in response to executable instructions contained within the software modules disclosed herein. These computer-executable instructions may transform the processor 1502 by specifying how the processor 1502 transitions between states, thereby transforming the transistors or other discrete hardware elements constituting the processor 1502.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1500 may further include one or more sensors 1514 or a battery or power supply 1520. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 1500 in order to store and execute the software components presented herein. It also may be appreciated that the architecture 1500 may include other types of computing devices, including wearable devices, handheld computers, embedded computer systems, smartphones, PDAs, and other types of computing devices known to those skilled in the art. It is also contemplated that the architecture 1500 may not include all of the components shown in FIG. 15, may include other components that are not explicitly shown in FIG. 15, or may utilize an architecture completely different from that shown in FIG. 15.

Various exemplary embodiments of the present hardware load balancer gateway on commodity switch hardware are now presented by way of illustration and not as an exhaustive list of all embodiments. An example includes a method performed by a networking device associated with a load balancer operating on one or more servers, in which the networking device employs a SONiC (Software for Open Networking in the Cloud) environment on a commodity hardware device, comprising: forwarding data packets using the load balancer that is associated with the networking device; intercepting, at the networking device, data packets that are on a flow path toward the load balancer; checking, by the networking device, whether flow state information for the data packets exists in memory that is associated with the networking device; depending on whether the flow state information exists in memory: calculating where to transmit the data packets responsive to the flow state information not existing in the memory; and transmitting the data packets using the flow state information responsive to the flow state information existing in memory.

In another example, the networking device includes an ASIC (application-specific integrated circuit) that checks its cache for the flow state information. As another example, the ASIC further uses RDMA (remote data memory access) to access flow state information stored on a memory device operating remotely to the networking device, wherein the memory device which supports the RDMA stores flow state information for each load balancer. In a further example, the method further comprising checking the RDMA-supported memory device after checking the ASIC's cache. In another example, the networking device uses RDMA (remote data memory access) to access a NAT (network address translation) table stored on a memory device operating remotely to the networking device, wherein the memory device which supports the RDMA stores the NAT table for each host device and virtual machine. In another example, the networking device includes an ASIC (application-specific integrated circuit) which intercepts the data packets. As a further example, the method further comprising synchronizing the flow state information calculated by the ASIC with a user mode container instantiated on the networking device, the user mode container being disaggregated from the ASIC such that the user mode container is operable by hardware components distinct from the ASIC. As a further example, the method further comprising: receiving, at the user mode container, datacenter configuration information which indicates that a server within the datacenter has been updated, removed from, or added to a set of servers; and determining which flow states within a hashing table are affected within the networking device based on the datacenter configuration information; and pushing, from the user mode container, the determined affected flow states to memory associated with the ASIC. In another example, the user mode container interfaces with a switch abstraction interface (SAI), and the SAI interfaces with components associated with the ASIC. In another example, the networking device is a switch or router. In a further example, the method further comprises performing, by the networking device, equal-cost multi-path routing for the intercepted data packets.

Another exemplary embodiment includes a networking device configured to utilize flow state information to manage forwarding of incoming data traffic affected by a dynamically sized datacenter, comprising: one or more processors; one or more non-transitory hardware-based memory devices associated with the one or more processors storing computer-readable instructions for operating application containers on the networking device; an application-specific integrated circuit (ASIC); and one or more caches associated with the ASIC, wherein the ASIC is configured to: receive a data packet destined for a host device; determine to which host device to forward the received data packet; and inform a user mode container of the application containers of a flow state associated with the data packets using the determination of which host device to forward the received data packet, wherein the user mode container stores the flow state within a flow state table.

In a further example, the determination of which host device to forward received data packets to is performed using a consistent hash methodology. In another example, the ASIC is further configured to check the cache for information describing affected data flows, and wherein the determination of which host device to forward the received data packets to is performed responsive to no affected data flows existing in the cache. In another example, the networking device receives, at the user mode container, a change to the datacenter, the change including a removal or addition of a server within the datacenter; determines affected data flows based on the datacenter change; and transmits information describing the affected data flows to the cache associated with the ASIC. As another example, the determination of which data flows are affected by the datacenter change is performed using consistent hash methodology.

Another example includes one or more hardware-based non-transitory computer-readable memory devices storing instructions which, when executed by one or more processors disposed in a networking device that is associated with a load balancer, cause the networking device to: intercept, at an application-specific integrated circuit (ASIC) associated with the networking device, data packets before the data packets reach load balancing multiplexers (MUXes), wherein the load balancing MUXes transmit data packets to virtual machines instantiated on host devices; query, by the ASIC, an external memory device associated with a remote computing device using remote direct memory access (RDMA), wherein the external memory hosts information usable by the networking device to route the intercepted data packets to host devices; and route at least a portion of the intercepted data packets to host devices using the information queried from the external memory device.

In another example, the information hosted on the external memory device is flow state information contained within a hash table. In a further example, the information is network address translation (NAT) information for virtual machines on the host devices. As a further example, the ASIC further utilizes consistent hash to calculate where to route a portion of the intercepted data packets.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A method performed by a networking device that includes an ASIC (application-specific integrated circuit) associated with a load balancer operating on one or more servers, in which the networking device employs a SONiC (Software for Open Networking in the Cloud) environment on a commodity hardware device, comprising:
forwarding data packets using the load balancer that is associated with the networking device;
intercepting, at the ASIC in the networking device, data packets that are on a flow path toward the load balancer;
determining by the ASIC in the networking device, whether flow state information for the data packets exists in a memory that is associated with the networking device;
depending on whether the flow state information exists in the memory:
calculating where to transmit the data packets responsive to the flow state information not existing in the memory;
transmitting the data packets using the flow state information responsive to the flow state information existing in the memory,
synchronizing the flow state information for the data packets with a user mode container instantiated on the networking device, the user mode container being disaggregated from the ASIC such that the user mode container is operable by hardware components distinct from the ASIC, and
pushing, from the user mode container to memory associated with the ASIC, flow states that the user mode container determines are affected based on a configuration of the one or more servers.

2. The method of claim 1, in which the networking device includes an ASIC (application-specific integrated circuit) that checks its cache for the flow state information.

3. The method of claim 2, in which the ASIC further uses RDMA (remote direct memory access) to access flow state information stored on a memory device operating remotely to the networking device, wherein the memory device which supports the RDMA stores flow state information for each load balancer.

4. The method of claim 3, further comprising checking the RDMA-supported memory device after checking the ASIC's cache.

5. The method of claim 2, in which the networking device uses RDMA (remote direct memory access) to access a NAT (network address translation) table stored on a memory device operating remotely to the networking device, wherein the memory device which supports the RDMA stores the NAT table for each host device and virtual machine.

6. The method of claim 1, further comprising:
receiving, at the user mode container, datacenter configuration information which indicates that a server within a datacenter has been updated, removed from, or added to a set of servers;
determining which flow states within a hashing table are affected within the networking device based on the datacenter configuration information.

7. The method of claim 1, in which the user mode container interfaces with a switch abstraction interface (SAI), and the SAI interfaces with components associated with the ASIC.

8. The method of claim 1, in which the networking device is a switch or router.

9. The method of claim 1, further comprising performing, by the networking device, equal-cost multi-path routing for the intercepted data packets.

10. A networking device configured to utilize flow state information to manage forwarding of incoming data traffic affected by a dynamically sized datacenter, comprising:
one or more processors;
one or more non-transitory hardware-based memory devices associated with the one or more processors storing computer-readable instructions for operating application containers on the networking device;
an application-specific integrated circuit (ASIC); and
one or more caches associated with the ASIC, wherein the ASIC is configured to:
receive a data packet destined for a host device;
determine to which host device to forward the received data packet using flow state information for data packets that exists in memory;
inform a user mode container of the application containers of the flow state information for the received data packet, wherein the user mode container stores the flow state information within a flow state table; and
synchronize the flow state information for data packets with the user mode container, the user mode container being disaggregated from the ASIC such that the user mode container is operable by hardware components distinct from the ASIC, and
pushing, from the user mode container to memory associated with the ASIC, flow states that the user mode container determines are affected based on a configuration of the dynamically sized datacenter.

11. The networking device of claim 10, in which the determination of which host device to forward received data packets to is performed using a consistent hash methodology.

12. The networking device of claim 11, in which the ASIC is further configured to check the cache for information describing affected data flows, and wherein the determination of which host device to forward the received data packets to is performed responsive to no affected data flows existing in the cache.

13. The networking device of claim 10, further including:
receiving, at the user mode container, a change to the datacenter, the change including a removal or addition of a server within the datacenter;
determining affected data flows based on the datacenter change; and
transmitting information describing the affected data flows to the cache associated with the ASIC.

14. The networking device of claim 13, in which the determination of which data flows are affected by the datacenter change is performed using consistent hash methodology.

15. One or more hardware-based non-transitory computer-readable memory devices storing instructions which, when executed by one or more processors disposed in a networking device that is associated with a load balancer, cause the networking device to:
intercept, at an application-specific integrated circuit (ASIC) associated with the networking device, data packets before the data packets reach load balancing multiplexers (MUXes), wherein the load balancing MUXes transmit data packets to virtual machines instantiated on host devices;
query, by the ASIC, an external memory device associated with a remote computing device using remote direct memory access (RDMA), wherein the external memory hosts flow state information usable by the networking device to route the intercepted data packets to host devices; and
route at least a portion of the intercepted data packets to host devices using the flow state information queried from the external memory device
synchronize the flow state information for the intercepted data packets with a user mode container instantiated on the networking device, the user mode container being disaggregated from the ASIC such that the user mode container is operable by hardware components distinct from the ASIC, and
pushing, from the user mode container to memory associated with the ASIC, flow states that the user mode container determines are affected based on a configuration of the host devices.

16. The one or more hardware-based non-transitory computer-readable memory devices of claim 15, in which the information hosted on the external memory device is flow state information contained within a hash table.

17. The one or more hardware-based non-transitory computer-readable memory devices of claim 15, wherein the information is network address translation (NAT) information for virtual machines on the host devices.

18. The one or more hardware-based non-transitory computer-readable memory devices of claim 15, in which the ASIC further utilizes consistent hash to calculate where to route a portion of the intercepted data packets.

19. The method of claim 6 in which the hashing table is implemented independently of a number of servers utilized in the datacenter.

20. The method of claim 1 further including using the ASIC to perform equal- cost multi-path routing (ECMP) when transmitting the data packets.

* * * * *